United States Patent [19]

Salesky

[11] 4,396,986

[45] Aug. 2, 1983

[54] DIGITAL DC POWER SUPPLY WITH CURRENT AND VOLTAGE MEASUREMENT

[75] Inventor: Emery Salesky, Denville, N.J.

[73] Assignee: Hewlett-Packard Company, Palo Alto, Calif.

[21] Appl. No.: 257,020

[22] Filed: Apr. 24, 1981

[51] Int. Cl.³ .................... G06F 15/20; G01R 11/57
[52] U.S. Cl. .............................. 364/483; 324/76 R
[58] Field of Search .................. 364/483, 481, 480; 324/76 R, 322

[56] References Cited

U.S. PATENT DOCUMENTS

| 4,077,061 | 2/1978 | Johnston et al. | 364/483 |
| 4,197,582 | 4/1980 | Johnston et al. | 364/483 |
| 4,229,795 | 10/1980 | Vieweg et al. | 364/483 |
| 4,263,653 | 4/1981 | Mecklenburg | 364/483 |
| 4,356,553 | 10/1982 | Steinle et al. | 364/483 |
| 4,360,879 | 11/1982 | Cameron | 364/483 |

Primary Examiner—Edward J. Wise
Attorney, Agent, or Firm—Donald N. Timbie

[57] ABSTRACT

Measurement of load current when a digitally controlled power supply is in a constant voltage mode and of voltage when it is in a constant current mode is achieved by dropping the current represented by the digital current selection signal in one case and the voltage represented by the digital voltage selection signal in the other case until the power supply would change its mode of operation as indicated by comparators. Actual change of mode is prevented by delaying or interrupting the application of the digital selection signals to their respective regulation circuits.

13 Claims, 10 Drawing Figures

DIGITAL DC POWER SUPPLY WITH CURRENT AND VOLTAGE MEASUREMENT

BACKGROUND OF THE INVENTION

This invention relates to an improved apparatus for measuring the current provided by a digitally controlled power supply when it is operating in a constant voltage mode and/or measuring the voltage provided when it is operating in a constant current mode. When the power supply operates in a constant voltage mode, voltage regulation means maintain the output voltage at a value represented by a digital voltage selection signal in response to the difference between the voltage represented by that signal and the output voltage; and when the power supply operates in a constant current mode, current regulation means maintain the output current at a value represented by a digital current selection signal in response to the difference between the current represented by that signal and the actual output current. As a power supply cannot operate in both modes at the same time, the voltage regulation means disables the current regulation means when the output current is less than that represented by the digital current selection signal, and the current regulation means disables the voltage regulation means when the output voltage is less than that represented by the digital voltage selection signal. The voltage regulation means and the current regulation means each provide a given mode signal when they are in control of the power supply.

Measurement of the output current when the power supply is operating in a constant voltage mode may be achieved by an ammeter, which is expensive and cumbersome, or it may be achieved by changing the digital current selection signal so as to reduce the current it represents until the power supply changes to a constant current mode and noting the current represented by the digital current selection signal at that time. Similarly, measurement of the output voltage when the power supply is operating in a constant current mode may be achieved by a voltmeter, which is expensive and cumbersome, or it may be achieved by changing the digital voltage selection signal so as to reduce the voltage it represents until the power supply changes to a constant voltage mode and noting the voltage represented by the digital voltage selection signal at that time. In many applications, changing the mode of operation of the power supply as is required by these methods of measuring current and voltage is highly objectionable.

BRIEF DESCRIPTION OF THE INVENTION

This invention enables measurement of the output voltage or current of a power supply without voltmeters or ammeters and without changing the mode of operation of the power supply. It also avoids the considerable expense of additional digital-to-analog converters. These results are achieved by provision of a first comparator having its inputs respectively connected so as to respond to a signal corresponding to the output current represented by the digital current selection signal and a signal corresponding to the actual output current. A second comparator is provided having its inputs respectively connected so as to respond to a signal corresponding to the output voltage represented by the digital voltage selection signal and a signal corresponding to the actual output voltage. Thus, when the digital current selection signal is changed so as to represent a current that is less than the output current, the output of the first comparator changes state; and when the digital voltage selection signal is changed so as to represent a voltage that is less than the output voltage, the output of the second comparator changes state. In addition, means are provided for preventing changes in the digital current selection signal that are made so as to measure output current in the manner previously described from affecting the current regulation means so as to cause it to change the mode of operation; and means are provided for preventing changes in the digital voltage selection signal that are made so as to measure output voltage in the manner previously described from affecting the voltage regulation means so as to cause it to change the mode of operation. The current or voltage at which such changes in mode would otherwise occur are indicated by the changes in state of the first and second comparators.

In a preferred embodiment of the invention, the operator does not have to indicate whether current or voltage is to be measured but only presses a measurement key so as to produce a measurement signal indicating that one measurement or the other is to be made. Means are provided for changing the digital current selection signal as required to make a current measurement in response to the measurement signal and a mode signal indicating that the power supply is in a constant voltage mode; and means are provided for changing the digital voltage selection signal as required to make a voltage measurement in response to the measurement signal and a mode signal indicating that the power supply is in a constant current mode.

DETAILED DESCRIPTION OF THE INVENTION

Although the invention will now be described in connection with a power supply in which regulation of a DC output voltage or current is achieved by varying the value of a resistive impedance, it will be understood that it could be used with a power supply having a different type of regulation or one that produces a regulated output AC voltage or current.

Figure 1:
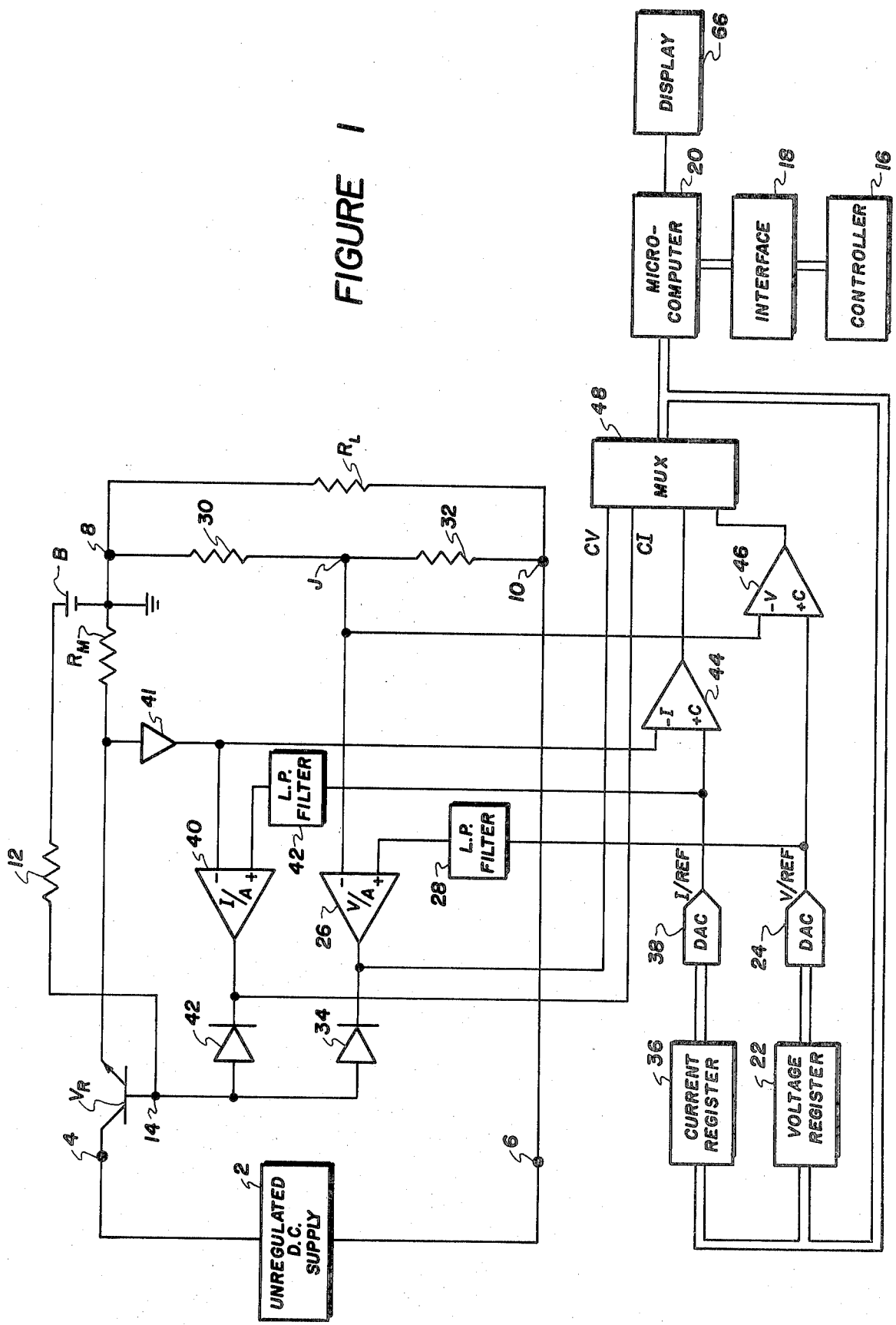
FIG. 1 is a schematic diagram of a DC power supply utilizing a computer for making current and voltage measurements in accordance with this invention.

In FIG. 1, a source 2 of unregulated DC voltage which may be derived by rectification of line voltage from a source, not shown, is connected between input terminals 4 and 6. In this particular illustration, a means for reducing the unregulated DC voltage so as to provide regulation is the collector-emitter path of an NPN transistor $V_R$ which is connected in series with a current metering resistor $R_M$ between the terminal 4 and an output terminal 8. A load $R_L$ is connected between the output terminal 8 and an output terminal 10, the latter being connected to the input terminal 6. A bias voltage source shown as being a battery B is connected between the output terminal 8 and the base of the transistor $V_R$ via a current limiting resistor 12. The unregulated DC voltage supplied by the source 2 is larger than any DC voltage that is to appear across the output 8, 10 and is reduced by the voltage drop across the resistance of the transistor $V_R$ so as to produce the desired amount of voltage across the load $R_L$ or cause the desired amount of current to flow through it.

When the power supply is operating in a constant voltage mode, the value of the resistance of the collector-to-emitter path of the transistor $V_R$ is controlled by applying a suitable voltage to its base electrode 14 with the following circuitry. The desired value of output voltage is typed or otherwise identified at a controller 16 and supplied via a suitable interface 18 to a computer 20 within the DC supply. The computer 20 provides a corresponding digital voltage selection signal to its voltage register 22, which is shown separately for ease in illustration. A digital-to-analog converter (DAC) 24 that provides an analog voltage selection signal is connected between the output of the voltage register 22 and a non-inverting input of a differential amplifier 26 via a low pass filter 28. Monitoring of the output voltage could be done directly, but in order to make the monitoring voltage have the same range as the analog voltage selection signal with which it is compared, it is customary to obtain a monitored voltage value at the junction J of two resistors 30 and 32 that are connected in series between the output terminals 8 and 10. The junction J is connected to the inverting input of the differential amplifier 26, and its output is connected to the base electrode 14 of the transistor $V_R$ via a diode 34. Whenever the monitored voltage at the junction J is greater than the analog voltage selection signal applied to the non-inverting input of the amplifier 26 via the filter 28, the output of the amplifier 26 is negative so that it can pass through the diode 34 to the base electrode 14 of the transistor $V_R$. The negative output of the amplifier 26 causes the resistance in the collector-to-emitter path of $V_R$ to be sufficient to make the output voltage have the selected value.

When the power supply is operating in a constant current mode, the value of the resistance of the collector-to-emitter path of the transistor $V_R$ is controlled by applying a suitable voltage to its base electrode under the control of the following circuitry. The desired value of current is typed or otherwise identified at the controller 16 and placed in digital form in a current register 36 that is usually part of the computer 20 but is shown separately for ease in illustration. A digital-to-analog converter (DAC) 38 that provides an analog current selection signal is connected between the output of the current register 36 and a non-inverting input of a differential amplifier 40 via a low pass filter 42. Monitoring the output current flowing to the load $R_L$ is done by grounding the end of the metering resistor $R_M$ that is connected to the output terminal 8 so that the voltage at the other end is proportional to the output current. This end of the resistor $R_M$ is connected via an amplifier 41 to the inverting input of the differential amplifier 40, and its output is connected to the base electrode 14 of the transistor $V_R$ via a diode 43. When the current produces a monitored voltage across the metering resistor $R_M$ that is greater than the analog current selection signal applied to the non-inverting input, the output of the amplifier 40 is negative so as to pass through the diode 43 to the base electrode 14 of the transistor $V_R$ and cause the resistance of the collector-to-emitter path of $V_R$ to be sufficient to make the output current have the selected value.

It is impossible to have constant voltage operation and constant current operation at the same time so that the resistance of the transistor $V_R$ is generally under the control of the differential amplifier 40 or under the control of the differential amplifier 26. Assume, for example, that the power supply of FIG. 1 is operating in a constant voltage mode. For output currents that are less than that corresponding to the analog current selection signal applied to the non-inverting input of the differential amplifier 40, the output of that amplifier is positive so that it cannot pass through the diode 43 to the base 14 of the transistor $V_R$. Thus, only the differential amplifier 26 is controlling the resistance of $V_R$ so as to regulate the output voltage in the manner just described. Now let the current increase to a value such that the monitored current voltage at the inverting input of the differential amplifier 40 is equal to or greater than that corresponding to the analog current selection signal. The output of the differential amplifier 40 becomes negative so that it now passes through the diode 43 to the base electrode 14. This causes the monitored voltage at J to be less than the analog voltage selection signal at the non-inverting input, thereby making the output of the amplifier 26 positive and biasing the diode 34 to cut-off. Thus, only the differential amplifier 40 controls the resistance of $V_R$, thereby keeping the output current at the value determined by the analog current selection signal. An analogous operation takes place if the power supply is operating in a constant current mode and the output voltage increases to a value exceeding that corresponding to the analog voltage selection signal.

In order to measure the output current when the power supply is operating in a constant voltage mode, a comparator 44 is provided. Its non-inverting input is connected to the output of the digital-to-analog converter 38 so as to receive the analog current selection signal, and its inverting input is connected to the ungrounded end of the metering resistor $R_M$ so as to receive the output current monitoring voltage.

In order that the computer 20 can acquire the required information, the respective mode signals CV and CI of the differential amplifiers 26 and 40 and the outputs of the comparators 44 and 46 are connected to different inputs of a multiplexer 48 which is coupled to the computer 20 in such a manner that the computer can selectively acquire the signal at any of the aforementioned inputs.

OPERATION OF FIG. 1

Figure 3A:
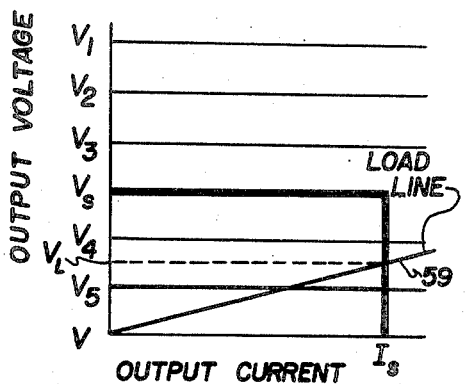
FIGS. 3A and 3B are graphs used in explaining the operation of the power supply when it is measuring output voltage.
Figure 3B:
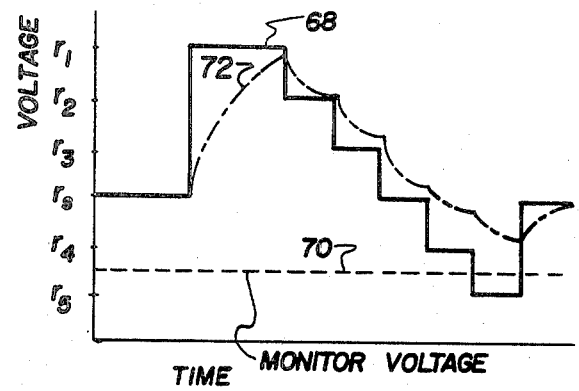
Figure 4:
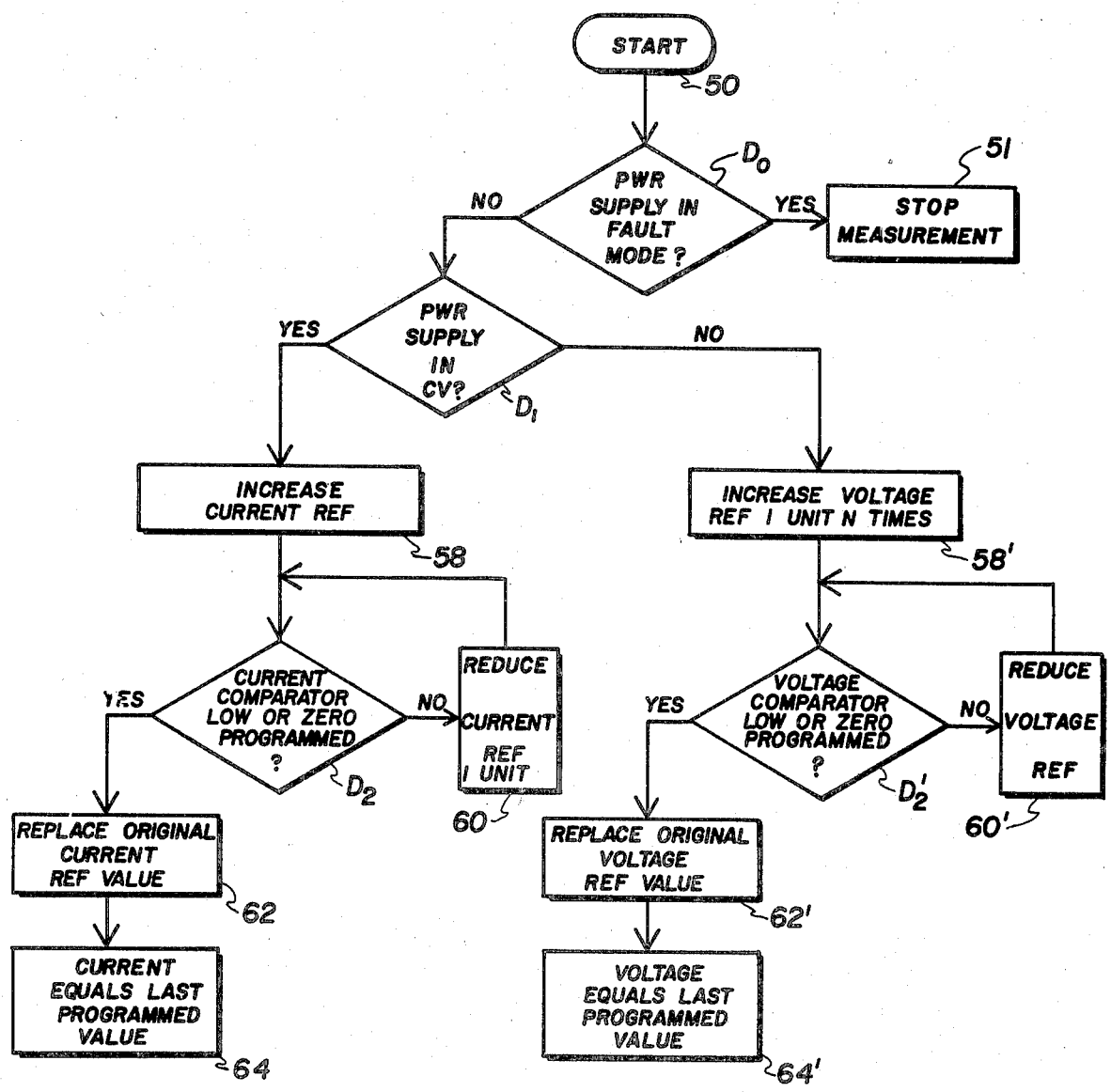
FIG. 4 is a flow chart indicating the steps taken by the microcomputer of FIG. 1 in making a current or voltage measurement.

The operation of the power supply schematically illustrated in FIG. 1 will now be explained by reference to the graphs of FIGS. 2A, 2B, 3A and 3B as well as to the flow chart for the computer 20 that is shown in FIG. 4. A program that is consistent with the flow chart for a computer including the Texas Instrument microprocessor TMS 9981, a ROM for storing the instructions for the microprocessor, and a RAM for storing data is presented at the end of the specification.

Should it be desired to make a measurement, it is not necessary to decide whether the power supply is in a constant voltage or a constant current mode so as to know whether to measure current or voltage. The start key on the controller 16 is simply depressed as indicated at 50 in FIG. 4, and the resulting signal causes a decision to be made, block $D_0$, as to whether the power supply is operating in a fault mode, i.e., in neither constant current or constant voltage. If the answer is YES, the measurement process is stopped, block 51. If the answer is NO, a decision, $D_1$, is made as to whether or not the power supply is in a constant voltage mode. The computer 20 determines this from the inputs of the multiplexer 48 that are respectively connected to the outputs of the differential amplifiers 40 and 26. If the power supply is in a constant voltage mode, the output CV of the differential amplifier 26 will be negative and the answer from the block $D_1$ is YES. The current measurement is then started.

Figure 2A:
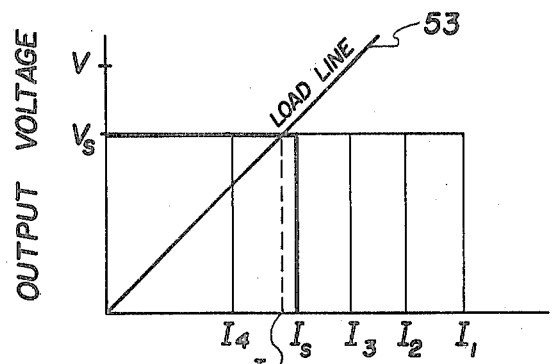
FIGS. 2A and 2B are graphs used in explaining the operation of the power supply when it is measuring output current.
Figure 2B:
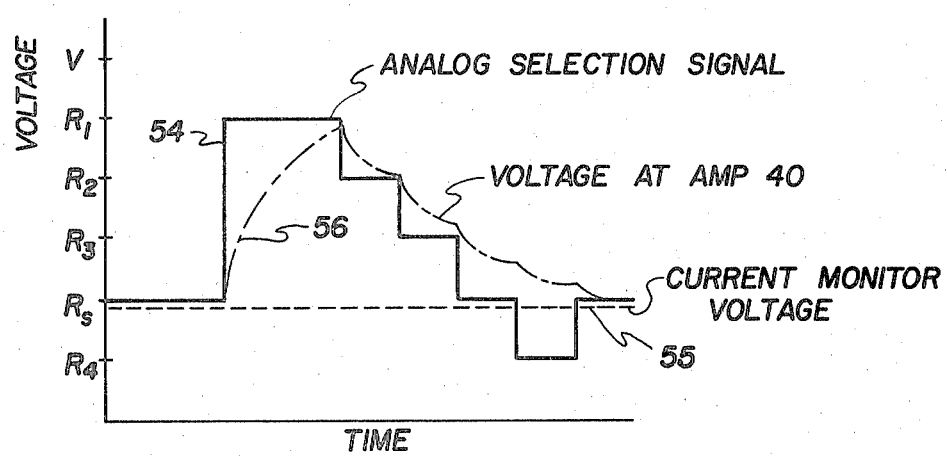

Before proceeding further along the flow chart of FIG. 4, attention is now called to the graphs of FIGS. 2A and 2B. In FIG. 2A, $V_S$ is the selected output voltage of the supply that corresponds to the digital voltage selection signal provided by the computer 20 at the voltage register 22; $I_S$ is the selected output current of the supply that corresponds to the digital current selection signal provided by the computer 20 at the current register 36; and the dashed vertical line $I_L$ is the actual output current to be measured as determined by the load line 53. In FIG. 2B, the solid line 54 represents various values of the analog current selection signal that will appear at the output of the digital-to-analog converter 38 during the current measurement process. The voltage $R_S$ of the analog current selection signal corresponds to the selected output voltage $V_S$. The current monitoring voltage produced at the ungrounded end of the metering resistor $R_M$ by the current $I_L$ is indicated by the dashed line 55, and the actual voltage applied to the non-inverting input of the differential amplifier 40 because of the action of the low pass filter 42 is indicated by the dash-dot line 56.

For reasons that will be explained, the computer 20 changes the value of the digital current selection signal at the current register 36, block 58 of FIG. 4, so as to cause the analog current selection signal 54 to increase to a value such as $R_1$ which corresponds to $I_1$ in FIG. 2A. During this time, the state of the comparator 44 is high so that the answer of decision block $D_2$ is NO. The digital current selection signal is then decreased by one step, block 60, so as to cause the analog current selection signal to decrease to a value $R_2$. This loop is repeated so as to lower the analog current selection signal one step at a time through values $R_3$, $R_S$ and $R_4$. In going from $R_S$ to $R_4$, however, the signal 54 crosses below the monitored current voltage 55 at the ungrounded end of $R_M$ so as to cause the output of the comparator 44 to become low and make the answer of $D_2$ YES. This also happens if the selected value of current is zero.

The computer 20 then provides the original digital current selection signal, which has been stored, to the current register 36 so that the analog current selection signal once again has a value $R_S$. Block 64 indicates that the computer 20 then supplies the last programmed digital current selection signal, which corresponds to the analog current selection value $R_4$ and a current $I_4$, to a display 66 or to any other point. $I_4$ is the measured current. Because of the exaggeration in the stepped changes in the analog current selection signal 54 produced by a unit change in the digital signal, the current $I_4$ appears to be far from the current $I_L$ that actually exists, but in an actual case the steps would be much smaller so that the measured value of current would be very close to $I_L$.

Because the actual analog current selection signal 56 applied to the non-inverting input of the current differential amplifier 40 does not drop below the current monitor voltage 55, the output of the amplifier 40 does not become negative so as to undesirably change the power supply to a constant current mode. It can be seen, however, that if the analog current selection signal were first dropped from $R_S$ to $R_4$ the analog current selection signal 56 actually applied to the differential amplifier 40 would drop below the current monitor voltage 55 so as to undesirably change the power supply to a constant current mode.

As an obvious variation, it should be noted that programmed digital current selection values other than the last one could be used, e.g., the next-to-last value which would correspond to the analog value $R_S$ in which case the measured current would be $I_S$.

Should the decision block $D_1$ indicate that the power supply is not in a constant voltage mode, the output voltage is measured. A similar procedure is followed and blocks at the righthand side of FIG. 4 that correspond in function to the blocks at the lefthand side are indicated by the same designations primed. The original selected values of voltage and current, $V_S$ and $I_S$, are shown in FIG. 3A as being the same as before, but the load line 59 is seen to be such that the power supply is in a constant current mode at the value $I_S$. The actual output voltage to be measured is indicated by the dashed line at $V_L$. In FIG. 3B, the solid line 68 is the analog voltage selection signal at the output of the digital-to analog converter 24, the dashed line 70 is the voltage monitor voltage at the junction J of FIG. 1, and the dash-dot line 72 is the analog voltage selection signal as it appears at the non-inverting input of the voltage differential amplifier 26. The computer 20 first increments the digital voltage selection signal so as to produce the analog voltage selection signal $r_1$. The computer 20 then decrements the digital voltage selection signal in minimum units so as to cause the analog voltage selection signal to successively pass through the values $r_2$, $r_3$, $r_s$, $r_4$ and $r_5$ which correspond to the voltages in FIG. 3A having the same subscripts. Between $r_4$ and $r_5$, the analog voltage selection signal 68 drops below the monitor voltage 70 so that the voltage comparator 46 changes state. The digital voltage selection signal is restored to its original value so that the analog voltage selection signal is also restored to its original value $r_s$. Since the last programmed digital value corresponds to the analog value $r_5$, the voltage corresponding to it, $V_5$, is the value of the measured voltage. The voltage $V_4$ could also be used.

Figure 1A:
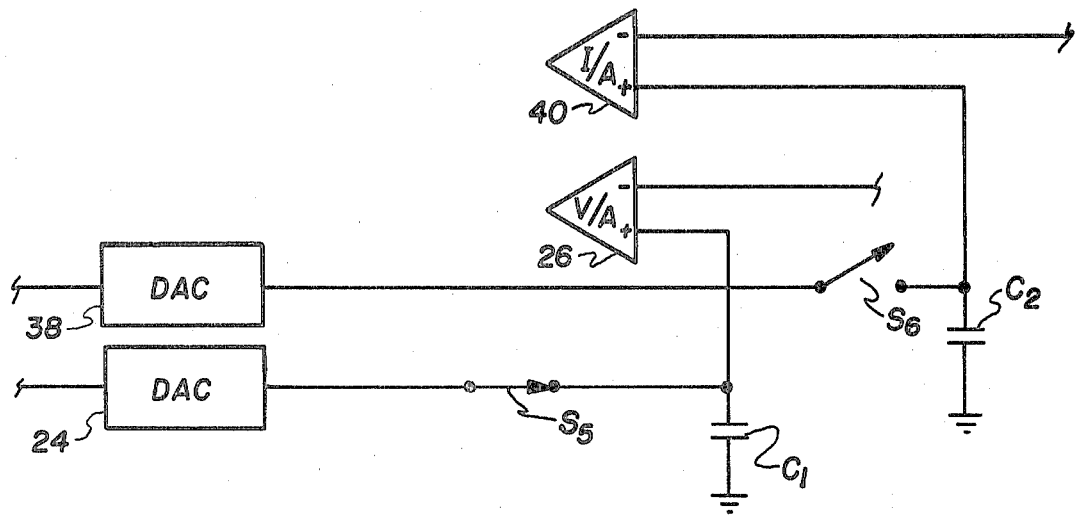
FIG. 1A is a schematic diagram of an alternative circuit for a portion of FIG. 1.

FIG. 1A illustrates another means for preventing the changes in programmed voltage and current required for the measurements of current and voltage from changing the mode of operation of the power supply. Switches $S_5$ and $S_6$ are respectively connected between the outputs of the DACs 24 and 38 and the ungrounded sides of capacitors $C_1$ and $C_2$ so as to form sample and hold circuits. The outputs of the DACs 24 and 38 are also respectively connected to the non-inverting inputs of the amplifiers 26 and 40. The switches $S_5$ and $S_6$ are normally closed. When current is being measured, the computer 20 can open $S_6$ so as to let the selected current reference voltage across the capacitor $C_2$ control the current amplifier 40; and when voltage is being measured, the computer 20 can open the switch $S_5$ so as to let the selected voltage reference across the capacitor $C_1$ control the voltage amplifier 26.

Figure 5:
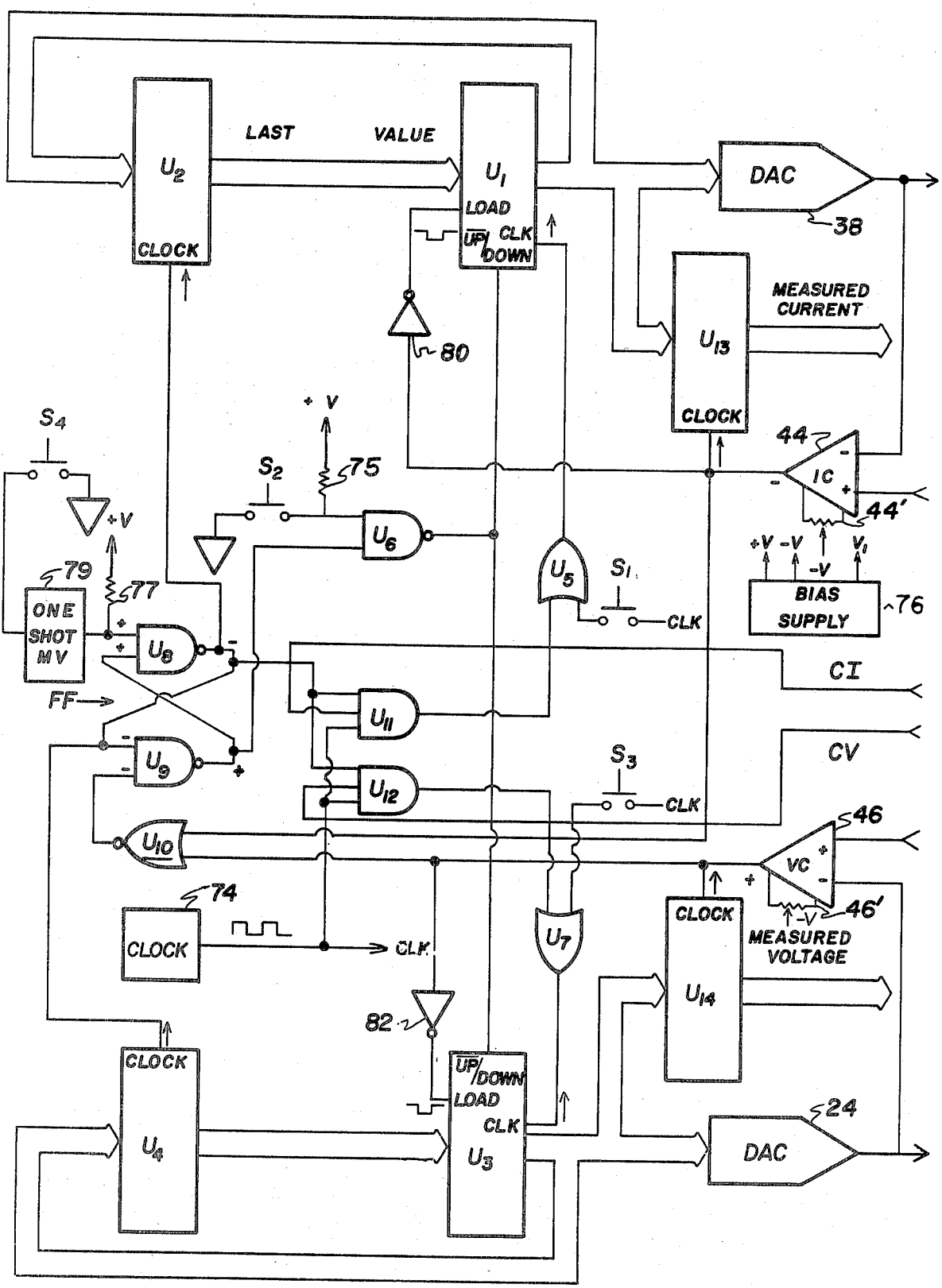
FIGS. 5 and 6 together form a schematic diagram of a DC power supply utilizing a circuit for making current or voltage measurements in accordance with this invention.
Figure 6:
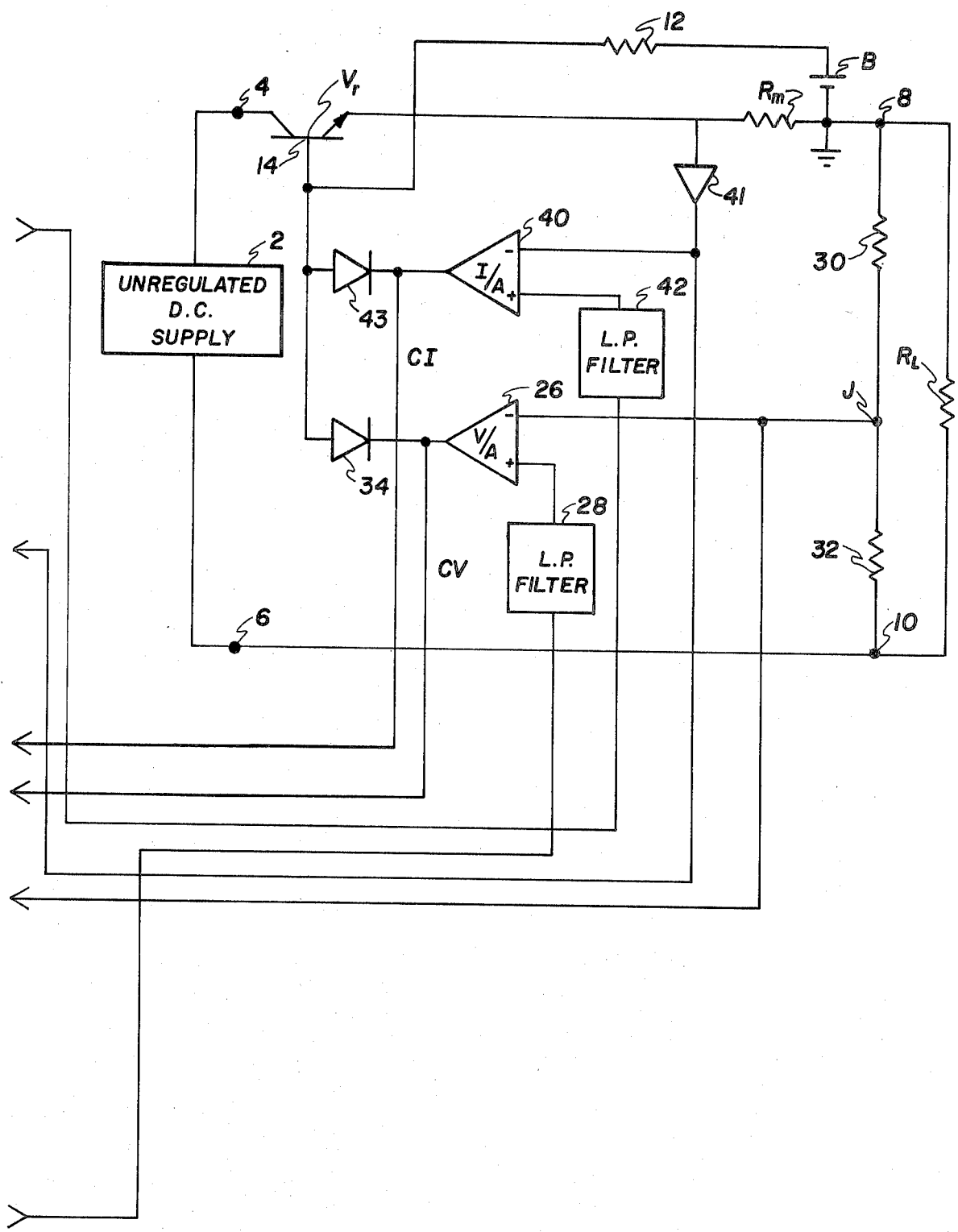

FIGS. 5 and 6

Reference is now made to the DC power supply illustrated in FIGS. 5 and 6 wherein a circuit is used in place of the computer 20 of FIG. 1 to perform the functions required to make current and voltage measurements in accordance with this invention. The only difference in function is that the digital current and voltage selection signals, and hence their analog counterparts, are not increased before decreasing them. Components performing the same functions as in FIG. 1 are designated in the same manner.

In FIG. 5, a counter $U_1$ provides the digital current selection signal to the DAC 38 which supplies the analog current selection signal for the desired maximum output current to the differential amplifier 40, FIG. 6, via the low pass filter 42. The output of $U_1$ is also connected to the input of a latch $U_2$ so that the output of $U_1$ can be retained while a current measurement is being made. Similarly, a counter $U_3$ provides the digital voltage selection signal to the DAC 24 which supplies the analog voltage selection signal for the desired maximum output voltage to the differential amplifier 26 via the loss pass filter 28. The output of $U_3$ is also connected to the input of a latch $U_4$ so that the output of $U_1$ can be retained while a voltage measurement is being made.

Selecting the desired output current is achieved by closing a switch $S_1$ so as to supply clock pulses from a clock 74 to one input of an OR gate $U_5$. As will be explained, the other input is low when a desired current is being selected so that the clock pulses pass through the OR gate $U_5$ to the clock input of the counter $U_1$ and cause it to count up or down depending on whether the output of a NAND gate $U_6$, which is connected to the UP/DOWN input of $U_1$, is low or high. As will be explained, one input of $U_6$ will normally be high so that the $+V$ volts bias applied to the other input via a resistor 75 from a bias supply 76 causes the output of $U_6$ to be low and make $U_1$ count up. In order to make it count down, a switch $S_2$ is provided for grounding the other input of $U_6$.

Selecting the desired output voltage is achieved in a similar manner. Closing a switch $S_3$ connects clock pulses from the clock 74 to one input of an OR gate $U_7$, and because the other input is low, for reasons that will be subsequently explained, the clock pulses will pass through $U_7$ to the clock input of $U_3$. As before, the output of $U_6$ is low so that $U_3$ counts up unless $S_2$ is closed so as to make it count down.

Measuring current or voltage is accomplished by the following circuit. A $+V$ volts is applied via a resistor 77 to an uncoupled input of a NAND gate $U_8$ that is cross-coupled with a NAND gate $U_9$ so as to form a flipflop FF. That same input is connected via a one-shot multivibrator 79 to a switch $S_4$ that has one terminal connected to ground. The uncoupled input of $U_9$ is connected to the output of a NOR gate $U_{10}$ having its inputs respectively connected to the outputs of the comparators 44 and 46. Note that the inputs of the comparators 44 and 46 are connected in a reverse manner from FIG. 1 and that their outputs are respectively connected via inverters 80 and 82 to the load inputs of $U_1$ and $U_3$. A resistor 44' is connected between two inputs of the comparator 44 and a slider in contact with the resistor 44' is connected to a point of voltage $-V$. Similarly a resistor 46' is connected between two inputs of the comparator 46 and a slider in contact with the resistor 46' is connected to a point of voltage $-V$. The sliders are respectively adjusted so that the comparators 44 and 46 respectively change state at values of the output current and output voltage that are slightly less than the corresponding analog current and voltage selection signals.

The output of $U_8$ is respectively connected to inputs of AND gates $U_{11}$ and $U_{12}$ so that as long as the output of $U_8$ is low, as shown, the outputs of the AND gates will be low. The outputs of $U_{11}$ and $U_{12}$ are respectively connected to inputs of $U_5$ and $U_7$ that, as previously explained, are respectively involved in selection of the output current and voltage of the power supply. One input of each of $U_{11}$ and $U_{12}$ is connected to the clock 74. A third input of $U_{11}$ is connected to the output of the current amplifier 40 so as to receive the mode signal CI, and a third input of $U_{12}$ is connected to the output of the voltage amplifier 26 so as to receive the mode signal CV. Thus, if the power supply is in a constant voltage mode, the clock pulses will pass through $U_{11}$ to $U_5$ and through it to the clock input of $U_1$; and if the power supply is in the constant current mode, the clock pulses will pass through $U_{12}$ and $U_7$ to the clock input of $U_3$.

It should also be noted that the output of $U_8$ is connected to the clock inputs of $U_2$ and $U_4$ so as to cause them to respectively latch the digital current and voltage selection values that correspond to the selected output current and voltage when $U_8$ goes high.

Figure 7:
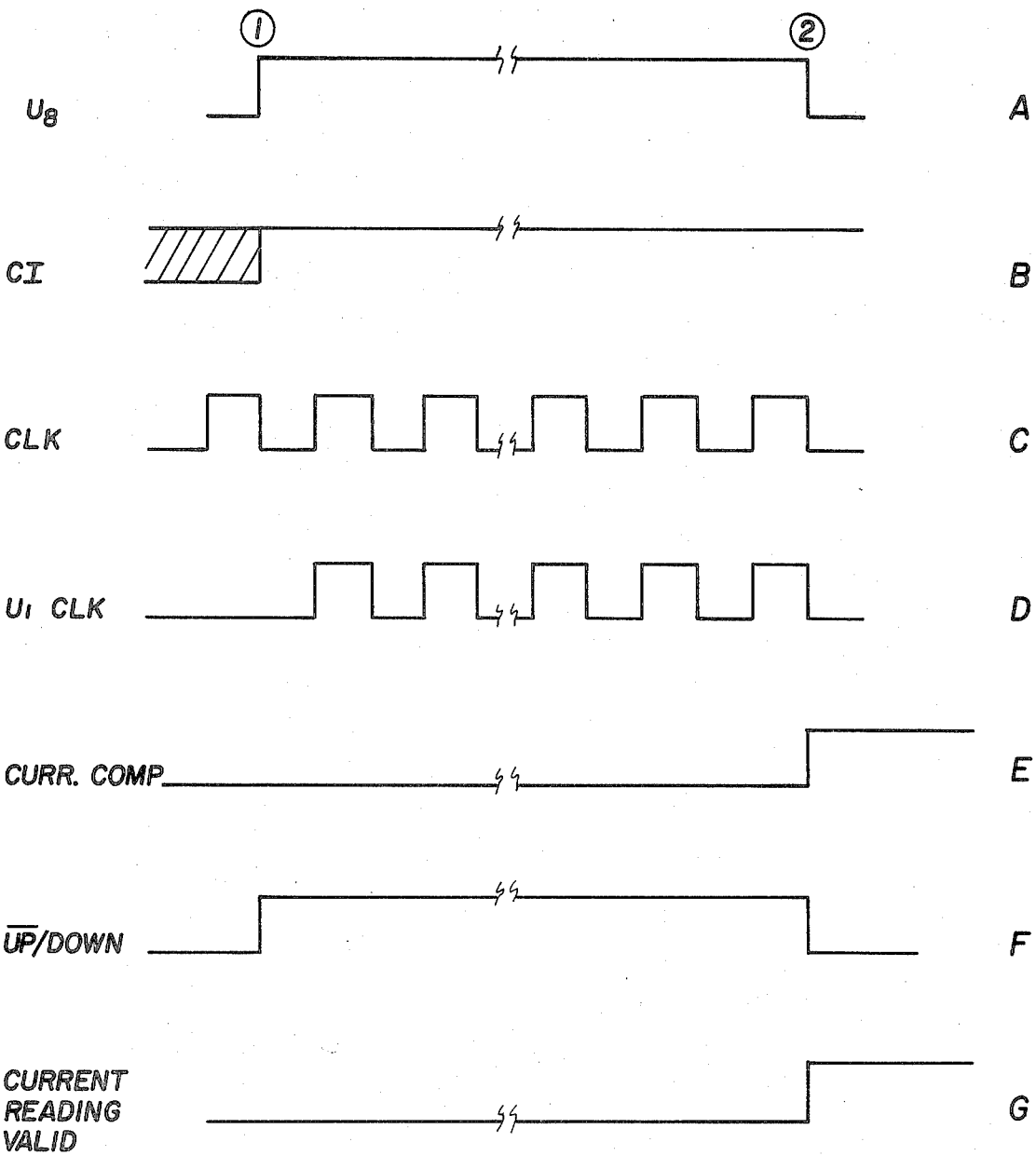
FIG. 7 is a series of graphs used in explaining the operation of the circuit of FIG. 5.

The operation of the circuit of FIGS. 5 and 6 will now be explained with reference to the graphs of FIG. 7. Assume that the power supply is operating in a constant voltage mode. When the switch $S_4$ is closed, the states in FF reverse from those shown. As seen in graph A, the output of $U_8$ goes high and, because CI is high, graph B, $U_{11}$ is enabled to pass clock pulses via $U_5$ to $U_1$. The clock pulses shown in graph C are applied to the clock input of $U_1$ as shown in graph D. $U_8$ going high causes $U_2$ to latch the digital current selection signal at the output of $U_1$. Because the output of the current comparator 44 is low, graph E, this value is not loaded into $U_1$. The output of $U_9$ now being low causes $U_6$ to make $U_1$ count down, graph F. When the digital current selection signal at the output of $U_1$ lowers the analog current selection signal at the output of the DAC 38 sufficiently to cause the comparator 44 to change from a low state to a high state, the digital value at the output of $U_1$ representing the measured current is transferred to a latch $U_{13}$, and because a low state is applied to the load input of $U_1$, the former digital current selection value at the output of $U_2$ is transferred to the output of $U_1$ so that the power supply continues to operate in a constant voltage mode and at the same voltage. The duration of the output pulse from the one-shot multivibrator 77 is so short that the reduction in the digital output of $U_1$ does not change the power supply to a constant current mode because of the previously explained action of the low pass filter 42.

Should the power supply be in a constant current mode when $S_4$ is closed to initiate a measurement, the following sequence of events takes place. $U_8$ goes high as before so as to cause $U_4$ to latch the digital voltage selection signal at the output of $U_3$. Because CV is high, $U_{12}$ will conduct clock pulses from the clock 74 to the clock input of $U_3$ via $U_7$. The output of $U_9$ goes low, causing $U_6$ to go high, $U_3$ to count down, and the analog voltage selection signal at the output of DAC 24 to drop. When this drop causes the output of the comparator 46 to become high, $U_{14}$ outputs the digital voltage selection signal then at the output of $U_{13}$. The signal corresponds to the measured output voltage. At the same time, a low state is applied to the load input of $U_3$ so as to make it transfer the original value of the digital voltage selection signal at the output of $U_4$ to the DAC 24 so that constant current operation can resume at the same value of current.

Computer Program for TMS 9981

```
ES20S   : IREAD
 1                         IDT    'IREAD'
 2               *
 3               *         ES20O       OBJECT FILE
 4               *         ES20S       SOURCE FILE
 5               *
 6               *     THIS PROGRAM USES WSP6
 7               *************************************************
 8               *     INITIALIZATIONS
 9               *
10               *
11       0000    MV         EQU    R0      MEASURED VALUE
12       0001    CKINFG     EQU    R1      MEASURED VALUE INVERTED
13       000B    CKINFG     EQU    R11     CLOCK INHIBIT FLAG
14       000E    OVI        EQU    R14     ORIGINAL VALUE INVERTED
15               *
16 0000' F000    F000       DATA   >F000
17 0002' 000A    TEN        DATA   10
18               *
19               *************************************************
20               *
21               *
22 0004' 02E0    SEND       LWPI   WSP6
   0006' 0000#
23 0008' 020C               LI     R12,>D0
   000A' 00D0
24 000C' 028B               CI     CKINFG,>0200  CLOCK TURNED OFF?
   000E' 0200
25 0010' 131E               JEQ    FAULT   EQ MEANS YES!
26 0012' 1FE6               TB     >E6     CV&M2?           (9C,D0)
27 0014' 1316               JEQ    VOLCOM  EQ MEANS YES
28 0016' 1FE7               TB     >E7     CC&M1?           (9E,D0)
29 0018' 130E               JEQ    CURCOM  EQ MEANS YES
30 001A' 1FE5               TB     >E5     OV?              (9A,D0)
31 001C' 1318               JEQ    FAULT   EQ MEANS YES
32 001E' 1FE4               TB     >E4     OR?              (98,D0)
33 0020' 1316               JEQ    FAULT   EQ MEANS YES
34               *
35               *THE SUPPLY IS IN NORMAL MODE
36               *
37 0022' D1E0               MOVB   @N,R7   SET PRE1
   0024' 0000#
38 0026' 8820               C      @MODES,@MODE2  M2?
   0028' 0000#
   002A' 0000#
39 002C' 1306               JEQ    MM2     EQ MEANS YES
40               *
41               *THE SUPPLY IS IN M1
42               *
43 002E' D820               MOVB   @A,@PRE2  SET PRE2
   0030' 0000#
   0032' 0000#
44 0034' 1019               JMP    IOUT    NOW MEASURE CURRENT
45 0036' D1E0    CURCOM     MOVB   @L,R7   SET PRE1 TO COMPLIANCE
   0038' 0000#
46 003A' D820    MM2        MOVB   @V,@PRE2  SET PRE TO INDICATE VOLTAGE
   003C' 0000#
   003E' 0032'#
```

```
47              *
48              *NOW MEASURE VOLTAGE
49              *
50  0040' 102D              JMP   VOUT
51  0042' D1E0     VOLCOM   MOVB  @L,R7        SET PRE1 TO COMPLIANCE
    0044' 0038'#
52  0046' D820              MOVB  @A,@PRE2     SET PRE2 TO INDICATE CURRENT
    0048' 0030'#
    004A' 003E'#
53              *
54              *NOW MEASURE OUTPUT CURRENT
55              *
56  004C' 100D              JMP   IOUT
57              *
58              *STORE "FV999999" TO INDICATE FAULT CONDITION
59              *
60  004E' D1E0     FAULT    MOVB  @F,R7
    0050' 0000#
61  0052' D820              MOVB  @V,@PRE2
    0054' 003C'#
    0056' 004A'#
62  0058' C220              MOV   @NINI,R8
    005A' 0000#
63  005C' C260              MOV   @NINI,R9
    005E' 005A'#
64  0060' C2A0              MOV   @NINI,R10
    0062' 005E'#
65  0064' 0460              B     @NOP         RETURN
    0066' 0000#
66              *
67              *THE FOLLOWING CODE MEASURES OUTPUT CURRENT
68              *
69  0068' 0300     IOUT     LIMI  IMASK0
    006A' 0000#
70  006C' 020C              LI    R12,>E8      ADDRESS OF IDAC
    006E' 00E8
71  0070' C3A0              MOV   @IDAC,OVI
    0072' 0000#
72  0074' 054E              INV   OVI          INITIALIZE ORIGINAL VALUE INV
73  0076' C020              MOV   @IDAC,MV     INITIALIZE MEASURED VALUE
    0078' 0072'#
74  007A' 0220              AI    MV,10        PROVISION FOR RUNNING START
    007C' 000A
75  007E' C040              MOV   MV,MVI       INITIALIZE MEASURED VALUE INV
76  0080' 0541              INV   MVI          AND FORMAT IT
77  0082' 4060              SZC   @F000,MVI
    0084' 0000'
78  0086' 0581     AGAIN    INC   MVI          NEXT STEP INVERTED
79  0088' 3301              LDCR  MVI,12
80  008A' 0600              DEC   MV           NEXT STEP
81  008C' 1303              JEQ   COMPL        IF ZERO MEASUREMENT COMPLETE
82  008E' 1D14              SBO   >14          TRIGGER NEW VALUE (E8,110)
83  0090' 1FD6              TB    >D6          COMPARITOR SXITCHED?(E8,94)
84  0092' 13F9              JEQ   AGAIN        IF NOT TRY AGAIN
85  0094' 330E     COMPL    LDCR  OVI,12       YES! RESTORE ORIGINAL VALUE
86  0096' 1D14              SBO   >14          TRIGGER IT (E8,110)
87  0098' 0460              B     @BINASI
    009A' 0000#
88              *
```

```
89                      *THE FOLLOWING CODE MEASURES OUTPUT VOLTAGE
9Ø                      *
91  ØØ9C'  Ø3ØØ   VOUT    LIMI   IMASKØ
    ØØ9E'  ØØ6A'#
92  ØØAØ'  Ø2ØC           LI     R12,>DØ       ADDRESS OF VDAC
    ØØA2'  ØØDØ
93  ØØA4'  C3AØ           MOV    @VDAC,OVI     INITIALIZE ORIGINAL VALUE
    ØØA6'  ØØØØ#
94  ØØA8'  Ø54E           INV    OVI           AND FORMAT
95  ØØAA'  CØ2Ø           MOV    @VDAC,MV      INITIALIZE MEASURED VALUE
    ØØAC'  ØØA6'#
96  ØØAE'  Ø22Ø           AI     MV,1Ø
    ØØBØ'  ØØØA
97  ØØB2'  CØ4Ø           MOV    MV,MVI        INITIALIZE MEASURED VALUE
98  ØØB4'  Ø541           INV    MVI           AND INVERT IT
99  ØØB6'  4Ø6Ø           SZC    @FOOO,MVI
    ØØB8'  ØØØØ'
1ØØ ØØBA'  Ø581   AGAIN2  INC    MVI           NEXT STEP
1Ø1 ØØBC'  33Ø1           LDCR   MVI,12
1Ø2 ØØBE'  Ø6ØØ           DEC    MV            NEXT STEP
1Ø3 ØØCØ'  13Ø3           JEQ    COMPL2        IF ZERO MEASUREMENT COMPLETE
1Ø4 ØØC2'  1D2Ø           SBO    >2Ø           TRIGGER NEW VALUE (DØ,11Ø)
1Ø5 ØØC4'  1FFF           TB     >FF           COMPARITOR SWITCHED? (DØ,CE)
1Ø6 ØØC6'  13F9           JEQ    AGAIN2        IF NOT TRY AGAIN
1Ø7 ØØC8'  33ØE   COMPL2  LDCR   OVI,12        YES! RESTORE ORIGINAL VALUE
1Ø8 ØØCA'  1D2Ø           SBO    >2Ø           TRIGGER NEW VALUE (DØ,11Ø)
1Ø9 ØØCC'  Ø46Ø           B      @BINASV
    ØØCE'  ØØØØ#
11Ø                       DEF    SEND
111                       REF    IDAC,VDAC,WSP6,PRE1,PRE@,N,A,L,F,V,MODE2
112                       REF    NINI,MODES,BINASV,BINASI,IMASKØ,NOP
113
114
115                       END
```

| | | | | | | | | | |
|---|---|---|---|---|---|---|---|---|---|
| A | ØØ48'# | AGAIN | ØØ86' | AGAIN2 | ØØBA' | BINASI | ØØ9A'# | BINASV | ØØCE'# |
| CKINFG | ØØØB | COMPL | ØØ94' | COMPL2 | ØØC8' | CURCOM | ØØ36' | F | ØØ5Ø'# |
| FAULT | ØØ4E' | FOOO | ØØØØ' | IDAC | ØØ78'# | IMASKØ | ØØ9E'# | IOUT | ØØ68' |
| L | ØØ44'# | MM2 | ØØ3A' | MODE2 | ØØ2A'# | MODES | ØØ28'# | MV | ØØØØ |
| MVI | ØØØ1 | N | ØØ24'# | NINI | ØØ62'# | NOP | ØØ66'# | OVI | ØØØE |
| PRE1 | ØØØØ# | PRE2 | ØØ56'# | SEND | ØØØ4' | TEN | ØØØ2' | V | ØØ54'# |
| VDAC | ØØAC'# | VOLCOM | ØØ42' | VOUT | ØØ9C' | WSP6 | ØØØ6'# | | |

Ø ERRORS

What is claimed is:

1. A direct current power supply, comprising
an input to which a source of unregulated DC voltage may be applied,
an output,
a first source of digital signals representing a selected output voltage,
a first digital-to-analog converter coupled to said first source of digital signals so as to produce an analog selected voltage signal,
a first monitoring circuit coupled to said output for deriving a first monitoring voltage that is proportional to the voltage across said output,
a second source of digital signals representing a selected output current,
a second digital-to-analog converter coupled to said second source of digital signals so as to produce an analog selected current signal,
a second monitoring circuit for deriving a second monitoring voltage that is proportional to the current flowing to said output,
output voltage control means coupled to the outputs of said first digital-to-analog converter and said first monitoring circuit for maintaining the DC voltage across said output at a value corresponding to the analog selected voltage signal when said output voltage control means is operative,
said output voltage control means being operative when the second monitoring voltage provided by said second monitoring circuit is less than the analog selected current signal,
output current control means coupled to the outputs of said second digital-to-analog converter and said second monitoring circuit for maintaining the DC current flowing to said output at a value corresponding to the current reference voltage when said output current control means is operative, said output current control means being operative when the first monitoring voltage provided by said first monitoring circuit is less than the analog selected current signal, a comparator having inputs respectively coupled to the same digital-to-analog converter and the same monitoring circuit as one of said output voltage or output current control means, means for changing, when activated, the digital signals provided by one of said first and second sources of digital signals so as to cause a step by step reduction in the analog selection signal provided by the digital-to-analog converter coupled to that source until said comparator changes state and then to restore the analog selection signal to its original value, display means for displaying the value of current or voltage corresponding to a step of the analog selection signal that is adjacent the step that caused the comparator to change state, and means for preventing the reduced analog selection signal from causing the output voltage or output current control means to which it is connected from changing the mode of operation of the power supply.

2. A power supply as set forth in claim 1 having
a second comparator having its inputs respectively coupled to the same digital-to-analog converter and the same monitoring circuit as the other of said output voltage or output current control means, means for changing, when activated, the digital signals provided by the other of said first and second sources of digital signals so as to cause a step by step reduction in the analog selection signal provided by the digital-to-analog converter coupled to that source until said second comparator changes state and then to restore the analog selection signal to its selected value, means for causing said display means to display the value of current or voltage corresponding to a step of the analog selection signal adjacent the step that caused the second comparator to change state, and means for preventing the reduced analog selection signal from causing the output voltage or output current control means to which it is connected from changing the mode of operation of the power supply.

3. A power supply as set forth in either of claims 1 and 2 wherein both said means for changing the digital signals cause them to increase the value of the analog selection signals before reducing them.

4. A power supply as set forth in claims 2 or 3 having
means providing a measurement initiation signal indicating that a measurement of the output voltage or output current is to be made, means responsive to said measurement initiation signal and to the operative condition of one of said output voltage or output current control means for activating the means for changing digital signals that are applied to the digital-to-analog converter providing a digital signal representing the other of said output voltage or output current control means.

5. A direct current power supply, comprising
an input,
a source of unregulated direct current voltage connected across said input,
an output,
a variable resistance connected between one side of said input and one side of said output, said variable resistance having a control input for varying the value of said resistance in accordance with the value of voltage applied thereto, a metering resistor connected in series with said variable resistance, a first differential having one input connected to receive the voltage across said metering resistor, a first source of digital signals representing the desired value of a current reference voltage, a first digital-to-analog converter coupled to receive the digital signals from said latter source, a low pass filter coupled between the output of said digital-to-analog converter and the other input of said first differential amplifier, a first diode connected between the output of said first differential amplifier and said control input of said variable resistance, a second differential amplifier having one input connected to receive at least a portion of the voltage across said output, a second digital-to-analog converter coupled to receive the digital signals from said latter source, a low pass filter coupled between the output of said latter digital-to-analog converter and the other input, a second diode connected between the output of said second differential amplifier and said control input of said variable resistance, a first comparator having one input connected to the output of said first digital-to-analog converter and a second input coupled to receive at least a portion of the voltage across the metering resistor, a second comparator having one input connected to the output of said second digital-to-analog converter and a second input coupled to receive at least a portion of the voltage across said output, means for causing, when activated, said first source of digital signals to represent successively lower steps of current reference voltage below the value at which it is initially set until the output of said first comparator changes state and then causing said first source of digital signals to output its initial digital value, and means indicating the current corresponding to a step of current reference voltage that is adjacent to the value of voltage at which said first comparator changed state.

6. A direct current power supply as set forth in claim 5 wherein
means are provided for causing, when activated, said second source of digital signals to represent successively lower steps of voltage reference voltage below the value at which it is set until the output of said second comparator changes state and then causing said second source of digital signals to output its initial digital value, and means indicating the current corresponding to a step of voltage reference voltage that is adjacent to the value of voltage at which said second comparator changed state.

7. A direct current power supply as set forth in claim 6 wherein said means for causing said second source of digital signals to represent successively lower steps of voltage reference voltage first causes said second source of digital signals to represent a step above the value at which it is initially set.

8. A direct current power supply as set forth in claim 6 wherein
selection means responsive to the outputs of said first and second differential amplifiers is provided for activating one of said means for causing said first source of digital signals to represent successively lower steps of current reference voltage and said means for causing said second source of digital signals to represent successively lower steps.

9. A direct current power supply as set forth in claim 8 wherein said selection means activates said means for causing said first source of digital signals to represent successively lower steps of current reference voltage when the output of said first differential amplifier is such as to cause said first diode to conduct and activate said means for causing said second source of digital signals to represent successively lower steps of voltage reference voltage when the output of said second differential amplifier is such as to cause said second diode to conduct.

10. A direct current power supply as set forth in claim 5 wherein said means for causing said first source of digital signals to represent successively lower steps of current reference voltage first causes said first source of digital signals to represent a step above the value at which it is initially set.

11. A power supply having apparatus for measuring the output current when it is operating in a constant voltage mode and for measuring output voltage when it is operating in a constant current mode, comprising
means for providing a digital signal representing a desired output voltage,
means for providing a monitored voltage signal corresponding to the output voltage,
means for providing a digital signal representing a desired output current,
means for providing a monitored current signal corresponding to the output current,
output voltage regulation means responsive to the digital signal representing the desired output voltage and to the monitored output voltage signal for maintaining the power supply in a constant voltage mode when the output current is less than the desired value,
output current regulation means responsive to the digital signal representing the desired output current and to the monitored output current signal for maintaining the power supply in a constant current mode when the output voltage is less than the desired voltage,
a comparator having inputs connected to respond to the digital signal representing the desired output current and the monitored current signal,
means for changing the digital signal representing current in steps until said comparator changes state,
means for indicating the output current corresponding to the step of said digital signal representing current that occurred adjacent to the change in state of said comparator,
means for preventing the changing of said digital signal representing current from making said current regulation means change the power supply to a constant current mode,
a comparator having inputs connected to respond to the digital signal representing the desired output voltage and the monitored voltage signal,
means for changing the digital signal representing voltage in steps until said comparator changes state,
means for indicating the output voltage corresponding to the step of said digital signal representing voltage that occurred adjacent to the change in state of said comparator, and
means for preventing the changing of said digital signal representing voltage from making said voltage regulation means change the power supply to a constant voltage mode.

12. A power supply having apparatus for measuring the output current when it is operating in a constant voltage mode, comprising
means for providing a digital signal representing a desired output voltage,
means for providing a monitored voltage signal corresponding to the output voltage,
means for providing a digital signal representing a desired output current,
means for providing a monitored current signal corresponding to the output current,
output voltage regulation means responsive to the digital signal representing the desired output voltage and to the monitored output voltage signal for maintaining the power supply in a constant voltage mode when the output current is less than the desired value,
output current regulation means responsive to the digital signal representing the desired output current and to the monitored output current signal for maintaining the power supply in a constant current mode when the output voltage is less than the desired voltage,
a comparator having inputs connected to respond to the digital signal representing the desired output current and the monitored current signal,
means for changing the digital signal representing current in steps until said comparator changes state,
means for indicating the output current corresponding to the step of said digital signal representing current that occurred adjacent to the change in state of said comparator,
means for preventing the changing of said digital signal representing current from making said current regulation means change the power supply to a constant current mode.

13. A power supply having apparatus for measuring the output voltage when it is operating in a constant current mode, comprising
means for providing a digital signal representing a desired output voltage,
means for providing a monitored voltage signal corresponding to the output voltage,
means for providing a digital signal representing a desired output current,
means for providing a monitored current signal corresponding to the output current,
output voltage regulation means responsive to the digital signal representing the desired output voltage and to the monitored output voltage signal for maintaining the power supply in a constant voltage mode when the output current is less than the desired value, output current regulation means responsive to the digital signal representing the desired output current and to the monitored output current signal for maintaining the power supply in a constant current mode when the output voltage is less than the desired voltage, a comparator having inputs connected to respond to the digital signal representing the desired output voltage and the monitored voltage signal, means for changing the digital signal representing voltage in steps until said comparator change state, means for indicating the output voltage corresponding to the step of said digital signal representing voltage that occurred adjacent to the change in state of said comparator, and means for preventing the changing of said digital signal representing voltage from making said voltage regulation means change the power supply to a constant voltage mode.

* * * * *